(12) United States Patent
Melde et al.

(10) Patent No.: US 11,491,715 B2
(45) Date of Patent: Nov. 8, 2022

(54) ADDITIVE MANUFACTURING METHOD AND APPARATUS FOR FABRICATING A COMPONENT USING ACOUSTIC FORCES TO POSITION PRECURSOR MATERIAL

(71) Applicant: Max-Planck-Gesellschaft zur Foerderung der Wissenschaften e. V., Munich (DE)

(72) Inventors: Kai Melde, Stuttgart (DE); Peer Fischer, Freiburg (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 230 days.

(21) Appl. No.: 15/536,345

(22) PCT Filed: Dec. 18, 2015

(86) PCT No.: PCT/EP2015/002561
§ 371 (c)(1),
(2) Date: Jun. 15, 2017

(87) PCT Pub. No.: WO2016/096144
PCT Pub. Date: Jun. 23, 2016

(65) Prior Publication Data
US 2017/0348907 A1 Dec. 7, 2017

(30) Foreign Application Priority Data
Dec. 19, 2014 (EP) ..................................... 14004333

(51) Int. Cl.
*B29C 64/165* (2017.01)
*G03H 1/02* (2006.01)
(Continued)

(52) U.S. Cl.
CPC .......... *B29C 64/165* (2017.08); *B29C 64/236* (2017.08); *B29C 64/264* (2017.08);
(Continued)

(58) Field of Classification Search
CPC ... B29C 64/165; B29C 64/264; B29C 64/236; G03H 1/0244; G03H 1/08; G03H 1/0891; G03H 3/00; B33Y 10/00; B33Y 30/00
See application file for complete search history.

(56) References Cited

U.S. PATENT DOCUMENTS 6,216,538 B1 * 4/2001 Yasuda ................ B01D 21/283
210/748.05
7,907,262 B2  3/2011 Scott et al.
(Continued)

FOREIGN PATENT DOCUMENTS

| CN | 1886684 A | 12/2006 |
|----|-----------|---------|
| CN | 1942736   | 4/2007  |

(Continued)

OTHER PUBLICATIONS

Richard B. MacAnally, and C. Yeh, Acoustic Imaging by Holography, Technical Report No. 69-48 Aug. 1969, The Office of Naval Research (Year: 1969).*

(Continued)

*Primary Examiner* — Jacob T Minskey
*Assistant Examiner* — S. Behrooz Ghorishi
(74) *Attorney, Agent, or Firm* — Caesar Rivise, PC (57) ABSTRACT

A method of fabricating a component (1) comprises the steps of providing precursor material in a working medium, creating acoustic forces and positioning the precursor material in the working medium under the effect of the acoustic forces, so that a material distribution is formed, which has a shape of the component to be fabricated, and subjecting at least one of the material distribution and the working
(Continued)

medium to a fixation, so that the precursor material of the material distribution or the working medium surrounding the material distribution is bound, wherein the step of creating the acoustic forces includes generating an acoustic interference pattern (5), and the material distribution (4) is formed by moving the precursor material (2) towards energy extrema of the acoustic interference pattern (5). Furthermore, an apparatus (100) for fabricating a component (1) is described.

20 Claims, 4 Drawing Sheets

(51) Int. Cl.
    *G03H 1/08*     (2006.01)
    *G03H 3/00*     (2006.01)
    *B29C 64/264*     (2017.01)
    *B29C 64/236*     (2017.01)
    *G03H 1/00*     (2006.01)
    *G03H 1/22*     (2006.01)

(52) U.S. Cl.
    CPC .............. *G03H 1/0244* (2013.01); *G03H 1/08* (2013.01); *G03H 1/0891* (2013.01); *G03H 3/00* (2013.01); *G03H 2001/0077* (2013.01); *G03H 2001/0094* (2013.01); *G03H 2001/0816* (2013.01); *G03H 2001/2231* (2013.01); *G03H 2001/2234* (2013.01); *G03H 2001/2289* (2013.01)

(56) References Cited

U.S. PATENT DOCUMENTS

| | | | | |
|---|---|---|---|---|
| 2002/0185782 A1* | 12/2002 | Koch | .................... | B29C 64/135 |
| | | | | 264/401 |
| 2003/0154790 A1* | 8/2003 | Venturelli | .......... | B29C 35/0805 |
| | | | | 73/570.5 |
| 2005/0122550 A1 | 6/2005 | Plewa et al. | | |
| 2005/0247866 A1 | 11/2005 | Plewa et al. | | |
| 2009/0002790 A1 | 1/2009 | Plewa et al. | | |
| 2009/0108190 A1 | 4/2009 | Plewa et al. | | |
| 2012/0034396 A1* | 2/2012 | Raeymaekers | .......... | B01J 19/06 |
| | | | | 427/601 |
| 2012/0068383 A1* | 3/2012 | Sinha | ...................... | B01J 19/06 |
| | | | | 264/437 |
| 2013/0068383 A1 | 3/2013 | St. Onge et al. | | |
| 2014/0230912 A1 | 8/2014 | Aider et al. | | |

FOREIGN PATENT DOCUMENTS

| | | |
|---|---|---|
| CN | 103906555 A | 7/2014 |
| WO | 2011113064 A1 | 9/2011 |

OTHER PUBLICATIONS

ADF (wnat is a piezo transducer), https://www.americanpiezo.com/piezo-theory/whats-a-transaucer.htm; accessed Feb. 25, 2021, first published Jan. 20, 2012 (Year: 2012).*

Anonymous (2014). Ultrasonic particle levitation—could it be used for 3d printing?. DIY 3D Printing Blogspot. Retrieved from the Internet: http://diy3dprinting.blogspot.nl/2014/01/ultrasonic-particle-levitation-could-it.html.

Caleap et al. (2014) Acoustically trapped colloidal crystals that are reconfigurable in real time Proceedings of the National Academy of Sciences, 111(17), 6226-6230.

European Search Report from corresponding EP 14004333 dated Jun. 9, 2015.

International Search Report from corresponding PCT/EP2015/002561 dated Mar. 16, 2016.

Office Action for corresponding Chinese Application No. 201580076196.5 dated Sep. 25, 2019.

* cited by examiner

ADDITIVE MANUFACTURING METHOD AND APPARATUS FOR FABRICATING A COMPONENT USING ACOUSTIC FORCES TO POSITION PRECURSOR MATERIAL

CROSS-REFERENCE TO RELATED APPLICATIONS

This application is a U.S. National Phase Application of PCT/EP2015/002561, filed Dec. 18, 2015, which claims priority to EP 14004333.2, filed Dec. 19, 2014, the contents of which applications are incorporated herein by reference in their entirety for all purposes.

BACKGROUND OF THE INVENTION

The invention relates to a method of fabricating a component having a one-, two- or three-dimensional geometry, wherein the shape of the component is obtained by utilizing an acoustic field and the effect of acoustic forces and by fixating a shape that forms in the acoustic field. This may be achieved by accumulating a material, like e. g. discrete particles in the pressure nodes formed by the acoustic field. Furthermore, the invention relates to an apparatus for fabricating a component, including an acoustic source device for forming an acoustic field that gives rise to a shape, including shapes formed by a particle distribution by acoustic forces, and a fixation device for fixating a shape of the particle distribution. Applications of the invention are available in the fields of fabricating materials with arbitrary shapes, e.g. for rapid prototyping purposes, and the assembly of materials.

Rapid prototyping methods play an increasing role in a broad range of technical applications, e.g. for fabricating model components or precursor materials. Conventional rapid prototyping is based on a serial addition of one- or two-dimensional structures, resulting in a complex two- or three-dimensional component. This includes the rapid prototyping method that is known as 3D printing. As a general disadvantage, the serial growing of the component is an additive, time-consuming method. Therefore, the application of conventional rapid prototyping is typically limited to the fabrication of single components. Routine applications of rapid prototyping or the fabrication of small batches is challenging. Furthermore, the conventional techniques of rapid prototyping may have limitations in terms of the available geometries of the components to be fabricated. The geometry has to be selected such that the shape of the growing component does not restrict the subsequent addition of one- or two-dimensional structures. Or alternately, a sacrificial material has to be used that fills those areas that will constitute openings or voids after post-processing. The sacrificial or filler material has to be removed in a post-processing step. It follows that one clear disadvantage is that fully enclosed hollow spaces can in general not be fabricated by conventional rapid prototyping methods.

Parallel fabrication methods have been proposed in US 2012/0068383 A1 and by M. Caleap et al. in "PNAS", vol. 111, 2014, p. 6226-6230. Particle distributions are formed under the effect of acoustic forces applied to particles in a liquid. The acoustic forces are formed by standing waves in a resonator accommodating the liquid with the particles. Although the shape of the standing waves can be influenced by the shape of the resonator and the number and arrangement of acoustic transducers, there is a strong limitation with regard to the achievable component geometry. The component can be fabricated with a shape formed by the superposition of standing waves, in particular with a specific symmetry only. Each particular shape to be fabricated requires an adapted resonator geometry and transducer arrangement, thus seriously limiting the flexibility in applying this conventional technique. Often the object must show mirror-symmetry with respect to the transducer arrangement, thus further limiting the usefulness.

Using particle manipulation with standing ultrasound waves for 3D printing also has been considered with reference to a video demonstration by the author in the internet blog http://diy3dprinting.blogspot.de/2014/01/ultrasonic-particle-levitation-could-it.html. However, the video demonstration shows the collection of particles in sound pressure nodes of the standing waves only. Creating the standing waves requires a predetermined geometry of the arrangement of multiple ultrasound arrays. Furthermore, groups of particles are separated from each other in the sound pressure nodes so that a fixation and formation of a complete component is excluded. Thus the cited considerations do not result in a 3D printing technique.

A first objective of the invention is to provide an improved method of fabricating a component, based on shaping a material distribution by the effect of acoustic forces, wherein disadvantages and limitations of conventional techniques are avoided. In particular, the fabrication method is to be capable to select the shape of the component with increased flexibility, in particular allowing irregular component shapes, and without a restriction to standing wave geometries. A second objective of the invention is to provide an apparatus for fabricating a component, based on shaping a material distribution by the effect of acoustic forces, wherein limitations and disadvantages of conventional techniques are avoided. In particular, the apparatus should allow the fabrication of components with more complex shapes, and it is to be characterized by a simplified structure and an improved reconfiguration capability for fabricating components having different shapes.

These objectives are solved by a method and an apparatus for fabricating a component.

BRIEF SUMMARY OF THE INVENTION

According to a first general aspect of the invention, the above objective is solved by a method of fabricating a component, wherein a precursor material is provided in a working medium and subjected to acoustic forces (acoustic radiation forces), so that a material distribution is formed, which has a shape of the component to be fabricated. At least one of the material distribution and the working medium is subjected to a fixation, wherein the material of the material distribution is bound or the material of the material distribution is bound with the working medium or the working medium is bound. The fixation comprises a binding, including a solidification or connection, of material and/or working medium constituents.

According to the invention, the acoustic forces are created by generating an acoustic interference image, preferably in the working medium. The acoustic interference image is formed by a plurality of sub-waves, which interfere with each other. Due to the interference of the sub-waves, the acoustic interference image is an acoustic intensity and phase image, preferably at a location in the working medium, and the acoustic interference image has a distribution of intensity extrema (intensity maxima and/or intensity minima). The acoustic interference image is a stationary one-, two- or three-dimensional image, preferably in the working medium, which is maintained during the operation of the acoustic source device.

The material distribution is formed at the location in the working medium, where the acoustic interference image is created (focus region of the acoustic interference image) or in a neighbourhood thereof. In the latter case, the focus region of the acoustic interference image can be outside the working medium. The precursor material is moved by the effect of the acoustic interference image within the working medium. Depending on the properties (compressibility, absorptivity, and reflectivity) of the material and the working medium, different acoustic forces act as translation forces onto the material and the surrounding medium, which are caused by the interaction with the acoustic interference image. Each material constituent, e. g. particles of the material, in particular in a mixture or suspension, may therefore move in a direction, which is determined by a gradient of the energy, and once it has moved to an energetically more favourable location, it can be held in this location or in the neighbourhood thereof. Accordingly, the precursor material is moved towards the energy extrema of the acoustic interference image. Preferably, the precursor material is collected around the energy extrema of the acoustic interference image (accumulation at the energy extrema) or at a holding surface, which is crossed by the gradients of energy provided by the acoustic interference image. The holding surface is a plane or curved surface placed in the working medium or adjoining the working medium. As an example, material constituents with a compressibility which is lower than the compressibility of the working medium are moved to the portions of the acoustic interference image, which have minimum pressure variations (e.g. pressure nodes). Otherwise, material constituents with a compressibility which is larger than the compressibility of the working medium are moved to the portions of the acoustic interference image, which have maximum pressure variations. Alternatively, the material constituents are moved towards the energy extrema and collected at the holding surface, which is e. g. a wall of a container or a material carrier in the working medium.

Usually, further forces act on the material to be shaped in the working medium, like e. g. the gravitational force. Other forces may include at least one of a force due to a chemical potential, an electric field force, an optical field force, and a magnetic field force. Subjecting the material to acoustic forces includes adjusting the acoustic forces in dependency on the further force(s), so that the material distribution is formed. With an example, if the material to be shaped comprises particles in a suspension, that would otherwise sediment, the material may be held against the gravitational force in the pressure nodes of the acoustic field.

With the construction of the acoustic interference image such that the precursor material is collected according to the shape of the component to be fabricated, the precursor material is arranged along a material distribution with one-, two- or three-dimensional topology (line or surface/bulk, straight and/or curved) having the shape to be created. Subsequently, the material distribution is fixated. The precursor material of the material distribution and/or the working medium are bound, so that the shape of the material distribution is maintained after the application of the acoustic forces.

According to a second general aspect of the invention, the above objective is solved by an acoustic fabrication apparatus, which is adapted for fabricating a component and which includes an acoustic source device. The acoustic source device includes at least one acoustic source, which is adapted for emitting acoustic waves to a working medium, e. g. in an inner space of a container or being held in free space. Preferably, the acoustic waves have frequencies in a non-audible frequency range, in particular ultrasound frequencies. Particularly preferred, the acoustic waves have a frequency of at least 20 kHz, in particular at least 40 kHz, up to the GHz-range.

According to the invention, the acoustic source device is adapted for generating an acoustic interference image, preferably in the working medium, wherein the acoustic interference image is formed by interfering sub-waves and has intensity extrema arranged according to the shape to be obtained. Advantageously, the acoustic interference image is not generated by a superposition of acoustic standing waves, but by the interference of the sub-waves.

The generation of the acoustic interference image provides two key advantages of the invention: Firstly, the generation of the acoustic interference image does not require an acoustic resonator accommodating the working medium with the particles. The acoustic interference image is created independently of an outer shape of the working medium and independently of any external resonator geometry. Accordingly, there are no particular limitations with regard to the shape of a container accommodating the working medium with the precursor material. The acoustic interference image is created independently of an inner shape of the container. The same container can be used for generating different acoustic interference images, i.e. for the fabrication of components having different shapes. Secondly, compared with the conventional superposition of standing waves, essentially more degrees of freedom are offered by the acoustic interference image for constructing the shape to be obtained. Accordingly, the invention is capable of creating components with more complex shapes and with increased flexibility. In other words, the acoustic fabrication apparatus has reduced limitations with regard to the design of the container and the arrangement of at least one acoustic source and an increased flexibility in setting different shapes of the component to be fabricated.

The term "acoustic interference image" refers to an acoustic wave front, which is generated by interference of sub-waves e. g. in the working medium. The sub-waves are created e. g. by at least one acoustic diffraction element and/or multiple acoustic sources. The acoustic interference image is formed in a two- or three-dimensional spatial region (image region, focus region). Preferably, the material distribution is shaped in the image region, in particular an image plane, of the acoustic wave front. In this case, the material distribution is collected in the focussed acoustic interference image. Alternatively, it is possible, that the material is formed in a region of the acoustic interference image, that is not an image plane of the acoustic wave front. In this case, the material distribution is collected in a neighbourhood of the focussed acoustic interference image, i. e. in a non-focussed portion of the interference wavefront.

Advantageously, various techniques for generating the acoustic interference image are available, which can be applied separately or in combination. Firstly, the acoustic interference image can be created as a holographic pattern, in particular a holographic image (in the following: first embodiment of the invention). Secondly, the acoustic interference image can be generated by superimposing acoustic waves generated with a plurality of acoustic sources (in the following: second embodiment of the invention). The acoustic sources can comprise e. g. at least one acoustic array device (integrated array of acoustic sources) or separate acoustic sources that are positioned in different locations.

Both of the first and second embodiments can be combined for generating the acoustic interference image.

According to the first embodiment, the holographic image is an interference pattern generated by transmitting an acoustic wave (primary acoustic wave) from an acoustic source via at least one acoustic diffractive element into the working medium. Advantageously, one single acoustic source, like e.g. a piezo-electric oscillator can be arranged for transmitting the acoustic wave to the acoustic diffractive element. Alternatively, a plurality of acoustic sources and/or a plurality of acoustic diffractive elements can be provided to generate the acoustic interference pattern in the working medium, e. g. inside the fabrication container or on at least one of its sidewalls.

The term "acoustic diffractive element" refers to a material, which is capable of an interaction with the wave-front of the primary acoustic wave such that the phases and/or amplitudes across the wave-front are specifically changed by diffraction. Each changed phase and/or amplitude provides a sub-wave contribution for the subsequent interference. The acoustic sub-waves interfering with each other are created by the at least one acoustic diffractive element. Preferably, the acoustic diffractive element is used like a holographic plate in optical holography or a diffractive optical element in projection optics. After the interaction of the wave-front of the acoustic wave with the acoustic diffractive element, the acoustic interference image is generated by self-interference of the acoustic wave, i.e. by interference of the sub-waves in the working medium. The self-interference creates the intensity distribution collecting the precursor material according to the shape to be obtained.

The acoustic diffractive element is structured or shaped such that it matches the wave front shape of the primary acoustic wave and the acoustic interference image to be obtained. The acoustic source creates e. g. a plane or spherical primary acoustic wave interacting with the acoustic diffractive element. However, the invention is not restricted to the use of plane or spherical waves. If other shapes of the wavefront initially generated by the acoustic source are used, the structure of the acoustic diffractive element can be adapted accordingly. The structure of the acoustic diffractive element is calculated using an algorithm for computer-based calculation of holograms, as it is known from optics, e.g. with the Gerchberg-Saxton-Algorithm. The calculation can readily be adapted to acoustics.

Preferably, the acoustic diffractive element is an acoustic hologram. Advantageously, the acoustic hologram may comprise a transmission hologram or a reflection hologram. The transmission hologram is adapted for shaping the wave-front during the transmission of the acoustic wave from the acoustic source to the location where the material distribution in the working medium is to be created. Using the transmission hologram may have advantages in terms of the structure of the acoustic fabrication apparatus and the geometry of directing the acoustic interference image into the working medium. For instance, the transmission hologram can be connected directly with the acoustic source, thus facilitating the adjustment of the wave-front image emitted from the acoustic source.

The reflection hologram is adapted for shaping the wave-front of the acoustic wave by a reflection thereof at the hologram material. The reflection hologram may have advantages with regard to changing the wave-front in the far field of the acoustic wave rather than in the near field. Furthermore, the acoustic wave travelling from the acoustic source to the location of forming the acoustic interference image is reflected within the working medium, i.e. the acoustic wave does not travel through an additional solid medium of varying thickness (e.g. the transmission hologram). Thus, the acoustic interference image can be generated as a pure phase hologram. One or more transmission hologram(s) and/or reflection hologram(s) can be combined for creating the acoustic interference image.

According to the second embodiment of the invention, the acoustic source device comprises multiple acoustic sources, preferably at least one acoustic array source. Preferably, one single acoustic array source can used for creating the acoustic interference image. The acoustic sources, e. g. of the acoustic array source, are individually controllable acoustic sources, like e.g. piezo-electric oscillators, each of which being adapted for emitting an acoustic wave. The acoustic sub-waves interfering with each other are created by individually controlling the acoustic sources. The acoustic waves of all individual sources are superimposed for generating the acoustic interference image in the working medium. The acoustic array source is a phased-array source, e. g. as known from ultrasound imaging applications. With the known position of the acoustic sources, e. g. the acoustic array source, relative to the location of generating the acoustic interference image, the single acoustic sources can be specifically controlled such that the wave-front of the superimposed acoustic waves has the shape to be obtained. The second embodiment of the invention has particular advantages with regard to a simplified structure of the acoustic fabrication apparatus. The acoustic interference image can be generated without the provision of an acoustic hologram, and the acoustic sources provide the full flexibility for creating different shapes of the component to be fabricated.

According to a further advantageous modification of the invention, the acoustic interference image can be generated with varying acoustic waveform. Varying the acoustic waveform includes at least one of varying the acoustic frequency, acoustic amplitude and/or acoustic phase. The acoustic interference pattern changes with time, by using a controller of the acoustic source device.

The acoustic waveform can be changed during shaping the material distribution in the working medium. Advantageously, slightly modulating the frequency would move the location of intensity extrema, e. g. nodal planes, a little. Combined with an adapted reaction time of the fixation, this would allow an adjustment of geometric features of the component, e. g. a wall thickness. Furthermore, the acoustic interference image can be switched during shaping the material distribution in the working medium, so that different patterns are created in a time-sharing manner. The speed of forming the acoustic interference image is higher than the speed of moving the precursor material, so that multiple patterns can be superimposed for forming an effective acoustic interference image shaping the material distribution.

Alternatively, the acoustic waveform can be changed after each fabrication step. Thus, varying the frequency allows one to use a single printed hologram for shaping components with different sizes. The size of the component can be increased by reducing the frequency and vice versa.

With a further advantageous modification of the first and/or second embodiment of the invention, an acoustic reference source can be provided, which is arranged for transmitting an acoustic reference wave into the working medium. The acoustic reference source comprises at least one acoustic source emitting the acoustic reference wave to the location of the acoustic interference image directly or via at least one acoustic reflector and/or beam splitter. Thus, the acoustic source of the acoustic source device creating the primary wave can be used for creating the acoustic reference wave as well. The acoustic reference wave travels to the location of generating the acoustic interference image along a reference direction deviating from the direction of the primary acoustic wave. Advantageously, the acoustic reference wave can facilitate the construction of the acoustic hologram and/or the acoustic interference image. Furthermore, the acoustic energy input is increased by the acoustic reference source.

Preferably, the acoustic fabrication apparatus comprises a container being configured for accommodating the working medium including the precursor material. The container is a vessel (receptacle, tank), the inner space of which can be filled with the working medium. The acoustic source device is arranged for creating the acoustic forces in the inner space of the container. Accordingly, at least one acoustic source is arranged within the container, integrated in a container wall or mechanically coupled with the container wall.

According to a further preferred variant of the invention, the acoustic fabrication apparatus comprises a fixation device, which is adapted for binding the precursor material and/or the working medium. Depending on the type of binding, the fixation device can be provided by a supply unit for introducing an external fixation input into the container. Alternatively or additionally, if the fixation input is given by thermal energy of the surrounding, the fixation device can be provided by the container and the acoustic source device holding the particle distribution during the fixation.

The fixation of the particle distribution is obtained by a binding process between the precursor material and/or within the working medium, while the material distribution is kept with the shape determined by the stationary acoustic interference image. In the particle distribution, the precursor material has different material properties compared with the surrounding medium outside of the particle distribution. The precursor material has a property that permits its binding or with the working medium or suppresses a binding of the working medium (if the surrounding medium is to be solidified).

Advantageously, various types of binding processes are available, which can be selected in dependency on the features of the precursor material and the working medium. If the material includes a reactive substance, which is capable of providing the binding reaction at the operation temperature of the acoustic fabrication apparatus, in particular at room temperature, the fixation is obtained simply by maintaining the acoustic interference image for a certain fixation time, e.g. in a range of seconds to hours. Alternatively, the fixation is triggered by supplying a fixation input, like at least one of thermal energy input, an irradiation input and a fixation agent input. For applying the thermal energy input, the fixation device includes a thermal source, like e.g. an infrared radiation source, directing thermal energy to the material distribution. Alternatively, a light source can be provided for directing the irradiation input to the material distribution. The light source may be adapted for emitting e.g. visible light or ultra-violet light. The fixation agent is a chemical substance which is capable of providing the binding process between the particles. The fixation agent is supplied into the working medium, e.g. via at least one supply line or using a spray process.

According to a further preferred embodiment, the whole precursor material of the material distribution can be fixated simultaneously. The fixation affects all material of the shaped material distribution at the same time. Advantageously, this provides a parallel fabrication of the component shape. In contrast to the conventional rapid, prototyping, the serial, time-consuming growth process of a component is avoided.

With the inventive application of the acoustic interference image, the material distribution is formed with the shape of the component to be obtained. According to an advantageous embodiment of the invention, the fixated material distribution can provide the material to be fabricated. The fixated material distribution is the component to be obtained, which optionally can be subjected to further finishing or processing steps.

Alternatively, the fixated particle distribution can provide an intermediate product, which is subjected to further processing in order to obtain the final component. For example, the intermediate product can be used as a carrier material for depositing a surface layer, made of e.g. metal or plastics, or the intermediate product is used for a molding process.

According to a further alternative, the working medium surrounding the material distribution can be fabricated as the component to be obtained or as an intermediate product to be subjected to further processing steps. With this embodiment, the fixation preferably includes the step of solidifying the working medium around the fixated material distribution and separating the solidified working medium from the fixated particle distribution. Advantageously, the component is formed with a shape being complementary with respect to the shape of the material distribution.

According to a further preferred variant of the invention, the steps of generating the acoustic interference image, forming the material distribution and subjecting at least one of the material distribution and the working medium to the fixation are repeated at least once. A component fabricated in a first fabrication phase can be used as an intermediate product for further fabrication phases. The component provides a substrate for the application of further material. A subsequent layer can be formed with a new acoustic pattern, which in turn is solidified, so that the shape of the final component is build up in layers. Alternatively, a volumetric structure can be build up successively from inner portions to outer portions ('inside-out').

It is also possible to keep the material distribution in the medium without separating the two, if this is desired, and then both may be solidified.

As a further advantage of the invention, a broad range of different precursor materials can be used, which are capable of moving in the working medium by the effect of the acoustic interference image. Preferably, the material comprises a flowable substance, including particles (precursor particles) or fluids. The material can be chemically homogeneous, or it can comprise a composition of chemical substances. With preferred examples, the precursor material comprise at least one of solid particles, granules, a powder, liquid particles, suspensions of pastes, polymers, droplets, bubbles, polymeric, and micellar particles, soft matter particles, and biological cells.

Solid particles may comprise e.g. metal, semiconductor, amorphous, ceramic, or plastics particles. Liquid particles, in particular droplets, can comprise e.g. solutions of salts, dyes, organic molecules, chemical initiators or inhibitors. The term "soft matter particle" refers to material including both of liquid and solid substances, like e.g. biological cells. The material may also contain one or more of the aforementioned examples and thus constitute hybrid material. The precursor particles may have a shape of a ball, a cylinder, a cube, a pyramid, a cone, a section thereof (truncated shape) or a superposition thereof. Alternatively, the material may have more complex regular or irregular geometries.

The size of the precursor material is selected in dependency on the working medium used and the size of the component to be obtained. With preferred applications of the invention, the precursor particles have a characteristic dimension smaller than or equal to the wavelength of interest, e.g. diameter, of at least 1 μm, preferably at least 10 μm and/or at most 5 mm, preferably at most 1 mm. Preferably, the particles and the working medium have the same mass density. Accordingly, the material can levitate in the working medium. However, this is not a requirement and the density difference may be used to remove any particles that are not trapped in the acoustic image for fixation.

The working medium used for carrying the precursor material and the shaped particle distribution generally comprises a flowable, gaseous or liquid medium, including at least one of a gas, like e.g. air, sulphur hexafluoride, an inert gas such as nitrogen, or argon, a low density gas such as helium, or a gas mixture, a liquid, like e.g. water, an oil, an organic solvent, a buffer solution, a molten substance, a slurry, which is a mixture of a liquid and inert particles, an emulsion, a suspension, and a foam. The gaseous working medium has particular advantages in terms of providing a higher acoustic contrast compared with a liquid working medium. Accordingly, larger acoustic forces can be applied to the particles.

Advantageously, components with various shapes can be fabricated with the inventive method, wherein the component has a main extension along a line, a surface, or a three-dimensional volume. The material distribution may form a topologically closed surface, like e.g. a closed volume or a toroid shape. With a further variant of the invention, the particle distribution may comprise at least two sub-distributions, which are created in the working medium simultaneously, but with a mutual separation. Each sub-distribution is created independently of any external resonator geometry and independently of an inner shape of the container. Furthermore, the material distribution may comprise a structure for creating a hollow component.

According to a further preferred embodiment of the inventive acoustic fabrication apparatus, the container may include a sub-container, which defines a sub-volume of the container for accommodating the precursor material and creating the particle distribution. Advantageously, the efficiency of using the precursor material can be improved by using the sub-container.

According to a further modification of the invention, the container may include a material carrier providing the holding surface. The material carrier can include e. g. an acoustically transparent material carrier or at least one of the container walls. This embodiment of the invention has particular advantages for using large precursor material constituents and/or creating the component with a main extension along a surface (2-dimensional component). The acoustic pattern is used to arrange material at the holding surface, e. g. the wall.

According to a particularly preferred embodiment of the invention, inner walls of the container are provided with acoustic absorbing and/or anti-reflection materials. With the absorbing and/or anti-reflection materials, any influence of the inner walls on the formation of the acoustic interference image can be suppressed.

BRIEF DESCRIPTION OF SEVERAL VIEWS OF THE DRAWINGS

Further details and advantages of the invention are described in the following with reference to the attached drawings, which show in.

DETAILED DESCRIPTION OF PREFERRED EMBODIMENTS

Preferred embodiments of the invention are described in the following with exemplary reference to the use of a liquid working medium, like e.g. water. It is emphasized that the invention is not restricted to this example, but rather can be implemented with a gaseous working medium, like air, as well. Furthermore, it is emphasized that the practical application of the invention is not restricted to the geometry of the described examples. Depending on the particular use of the invention, in particular the shape of the container, the arrangement of the acoustic source device and/or multiples thereof and/or the geometry of acoustic beam path can be modified.

Exemplary reference is made to a particulate material, but the invention is similarly applicable to accumulating and assembling material in other forms or mixtures, in the form of granules, suspensions of pastes, and/or polymers.

The drawings represent schematic illustrations only. In a practical implementation, power supply and control units are provided for operating the acoustic source device and fixation device. In particular, control units are provided for applying operation voltages to oscillators of acoustic sources, thus defining the amplitude, frequency and phase of the primary acoustic waves emitted by the acoustic sources.

Figure 1:
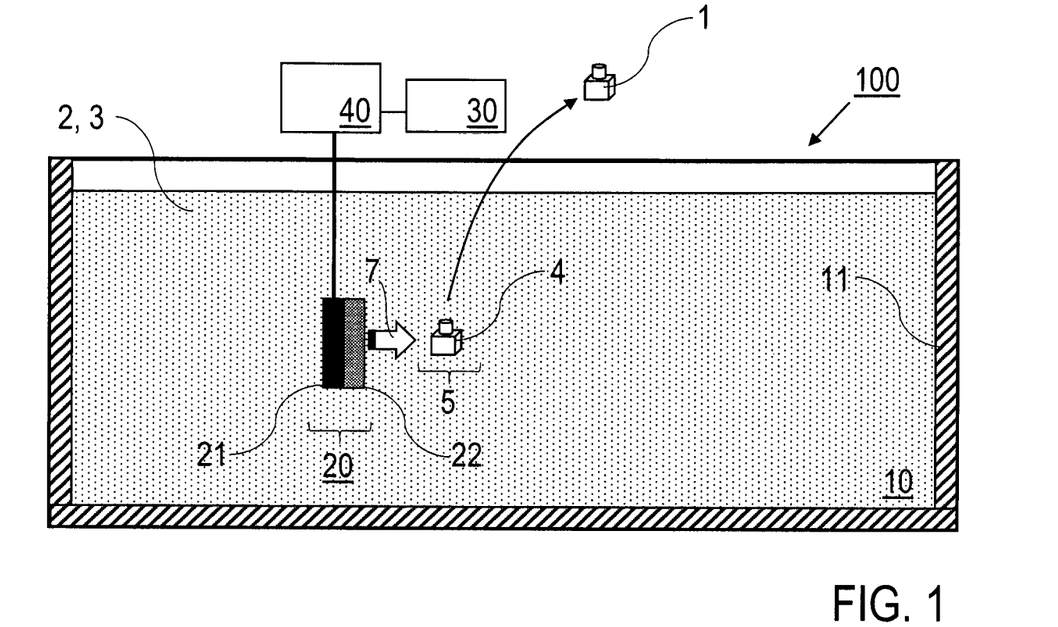
FIG. 1: a cross-sectional view of the first embodiment of the inventive acoustic fabrication apparatus using a transmission hologram.

According to FIG. 1, the first embodiment of the acoustic fabrication apparatus 100 comprises a container 10, an acoustic source device 20 (with power source and amplifier, not shown), a fixation device 30 and a control device 40. The container 10 comprises a vessel with an e.g. cubic shape having an inner space with a volume of e.g. 50 l. The walls 11 of the container 10 are made of e.g. glass, plastics, metal, like steel, or ceramic. The upper side of the container 10 can be open or closed. Preferably, the inner surfaces of the container walls 11 carry a sound absorbing layer, made of e.g. elastic plastic or rubber.

The acoustic source device 20 comprises an acoustic source 21, which is connected with the control device 40, and a transmission hologram 22. The acoustic source 21 comprises e.g. a piezo-electric oscillator with a diameter of e.g. 25 mm, which is supported by a metal plate and which creates a primary acoustic wave with a spherical wave front. The acoustic source 21 is arranged in the container 10 such that the primary acoustic wave is horizontally emitted.

The transmission hologram 22 is a planar plate, which is arranged adjacent to the acoustic source 21 (in the near field of the acoustic source 21, as shown) or with a distance therefrom. The transmission hologram 22 is made of a plastic with a structure as described e.g. with reference to FIG. 5 below. The transmission hologram 22 provides a so-called Fresnel hologram, which allows a reconstruction of the acoustic interference image 5 in the near field without additional imaging elements, like e.g. a transformation lens. In particular, a plurality of columns is provided on the planar plate, wherein the columns have different lengths perpendicular to the planar extension of the transmission hologram 22. Depending on the length of the columns, a locally specific phase shift can be applied to the wave front of the primary acoustic wave. By scattering the primary acoustic wave at the structure of the transmission hologram 22, a plurality of sub-waves 7 is created, which interfere with each other. An acoustic interference image 5 is obtained with a distance of e.g. 2 cm from the acoustic source device 20.

The fixation device 30 is adapted for supplying a fixation input to the inner space of the container 10, in particular to the location of the acoustic interference image 5. With a preferred example, the fixation device 30 comprises a thermal emitter for supplying thermal radiation energy, e. g. an infrared source. The fixation device 30 is connected with the control device 40, which controls the operation of the fixation device 30 simultaneously with the operation of the acoustic source device 20.

With a practical example of fabricating the component 1, the container 10 of FIG. 1 is filled with the working medium 2, like e.g. water. Precursor particles 3, like e.g. Polydimethylsiloxan (PDMS) particles having a diameter below 50 μm are distributed in the working medium 2. According to the fabricating method of the invention, an acoustic interference image 5 is created by the acoustic source device 20, wherein the acoustic interference image 5 is characterized by intensity extrema corresponding to the shape of the component 1 to be obtained. The PDMS particles form a particle distribution 4 by moving them to a volume with the shape of the component 1.

After the formation of a particle distribution 4 with the shape of the component 1 to be obtained, the fixation device 30 is activated for fixating the particles 3. The time duration of forming the particle distribution 4 may comprise e.g. some seconds or minutes. By the effect of thermal radiation, the particles 3, which are in contact with each other in the particle distribution 4 are bound to each other. After a certain fixation time, the particle distribution 4 is solidified, and it can be taken from the container 10 as the component 1 to be obtained. After a brief period of balancing the particle distribution, or refilling the volume, in the working medium 2, the next component 1 can be fabricated.

With another example, the precursor material comprises air bubbles distributed in a liquid working medium, e. g. liquid PDMS (like Sylgard 184, manufacturer Dow Corning). The fixation comprises a setting of the PDMS, obtained by thermal energy), so that a component with a defined hollow space is obtained. According to a further example, the precursor material comprises polystyrene particles in a liquid working medium, e. g. liquid epoxy. After setting the epoxy, the component comprises the solidified epoxy with the embedded particles.

Figure 2:
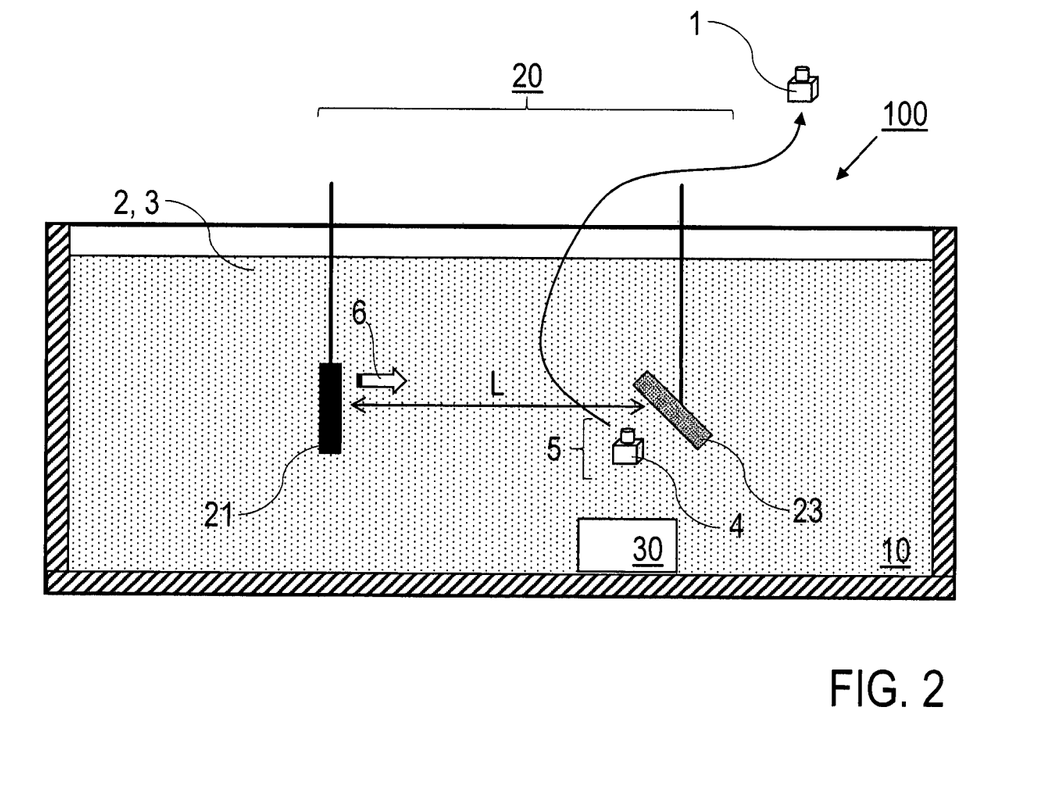
FIG. 2: a modified variant of the first embodiment of the acoustic fabrication apparatus, using a reflection hologram.

FIG. 2 illustrates a modified variant of the first embodiment of the acoustic fabrication apparatus 100 with the container 10, the acoustic source device 20 and the fixation device 30. The acoustic source device 20 comprises an acoustic source 21 as in FIG. 1 and a reflection hologram 23, which is positioned in the far field of the acoustic source 21. The primary acoustic wave 6 is directed to the reflection hologram 23 with a frequency of e.g. 1 MHz and a corresponding wavelength of 1.5 mm in water. With the diameter of the acoustic source 21 of 25 mm and a sound velocity in the working medium 2 of 1498 m/s, the distance L between the acoustic source 21 and the reflection hologram 23 is larger than $D^2/(4*\lambda)=104$ mm. The use of the reflection hologram 23 has advantages in terms of a simple shape of the wave front of the primary wave 6 in the far field and the travelling of the primary wave 6 and the sub-waves generated by the reflection hologram 23 exclusively through the liquid working medium 2.

For fabricating a component 1, the acoustic source device 20 is operated by a control device (not shown in FIG. 2) so that the acoustic interference image 5 is created in the working medium 2 and the precursor particles 3 are collected as the particle distribution 4. After the formation of the particle distribution 4, the fixation is obtained by a fixation input introduced by the fixation device 30. With this embodiment, the fixation device 30 may comprise e.g. an UV light source.

Figure 3:
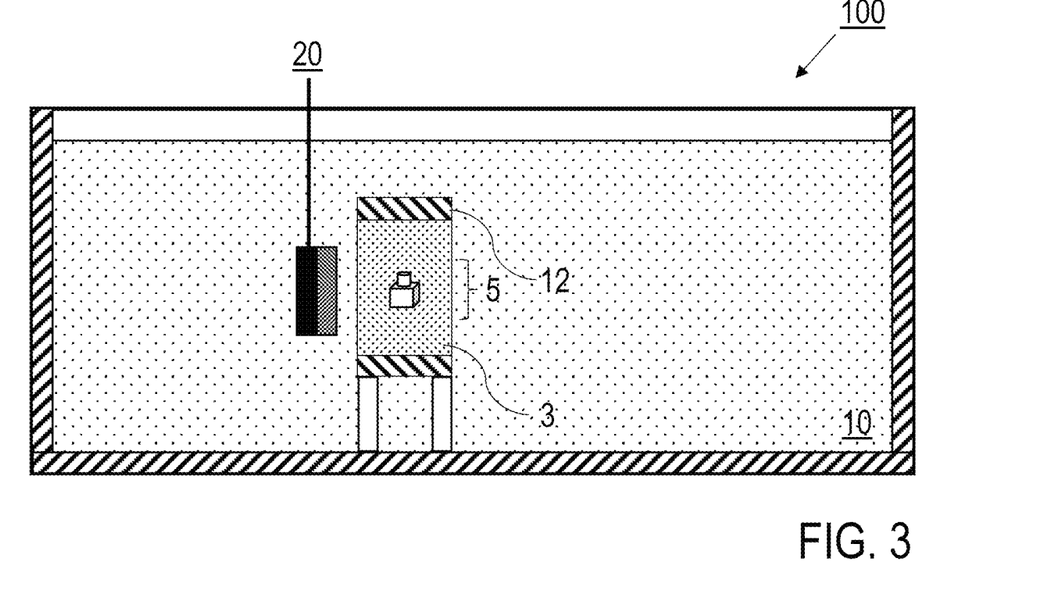
FIGS. 3 and 4: further modifications of the first embodiment, wherein the acoustic fabrication apparatus is provided with a sub-container or a material carrier, respectively.

FIG. 3 illustrates another variant of the first embodiment of the acoustic fabrication apparatus as shown in FIG. 1. With this variant, the precursor particles 3 are not distributed in the working medium 2 in the whole inner space of the container 10, but rather in a sub-container 12. The sub-container 12 is supported in the inner space of the container 10 at the location of forming the acoustic interference image 5 with the acoustic source device 20. The sub-container 12 comprises a vessel with an e.g. cylindrical shape. At least one wall of the sub-container 12 is formed by a layer material, like e.g. a foil, which is adapted for transmitting the acoustic waves into the sub-container 12. In operation of the acoustic fabrication apparatus 100, the working medium 2 is filled into the sub-container 12 and the precursor particles 3 are distributed within the working medium 2 in the sub-container 12. The sub-container 12 is immersed in the remaining working medium 2 or another liquid within the container 10 in front of the acoustic source device 20. The particle distribution 4 is formed and fixated as described above with reference to FIG. 1.

Figure 4:
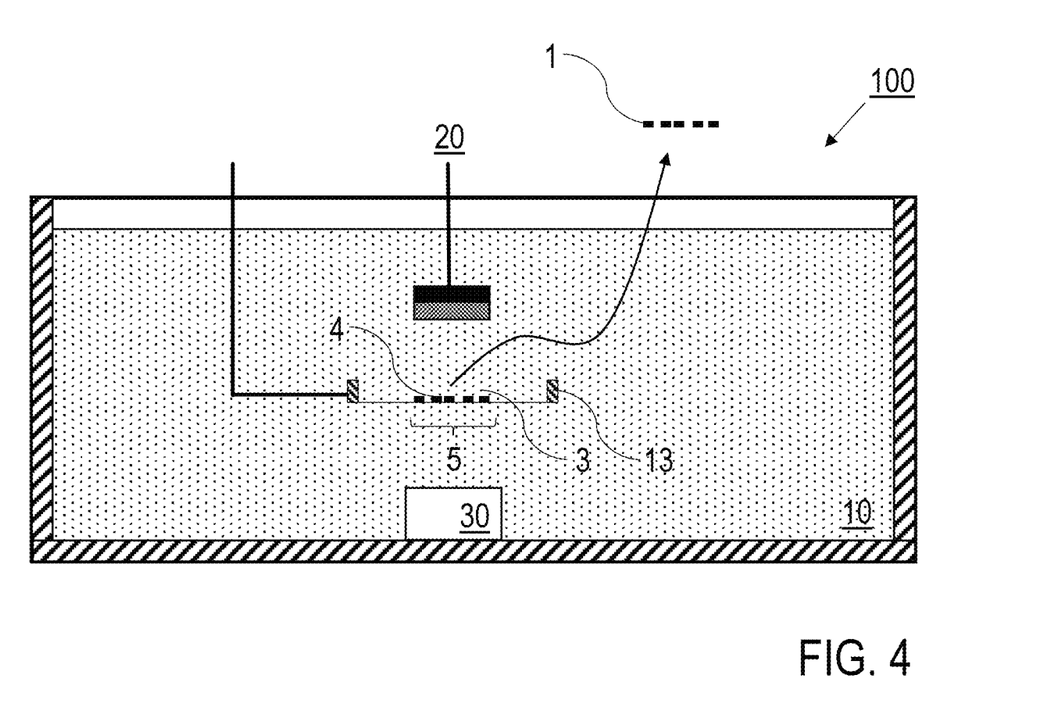

According to a further variant of the first embodiment of the acoustic fabrication apparatus 100, a two-dimensional particle distribution 4 can be formed as illustrated in FIG. 4.

With this variant, the container 10 includes an acoustically transparent material carrier 13, which is made e.g. of a polyester membrane. Particles 3 are sedimented on the material carrier 13 by the effect of gravity. The acoustic source device 20 is arranged for emitting the acoustic interference wavefront in a vertical direction towards the particle carrier 13. According to the shape of the acoustic interference image 5, a two-dimensional arrangement of the particle distribution 4 is formed. It is not necessary that the acoustic interference image 5 is focussed in the plane of the material carrier 13. Alternatively, the acoustic interference image 5 is focussed below the plane of the material carrier 13. The acoustic forces move the particles 3 toward extrema of the acoustic interference image 5, and they are collected by the holding surface of the material carrier 13. After the fixation with the fixation device 30, the layer-shaped component 1 to be obtained can be taken from the container 10. The variants of FIGS. 3 and 4 can be combined, i.e. the particle carrier 13 can be arranged in a sub-container 12 in the inner space of the container 10.

As an alternative, the material distribution can be formed at or close to a wall of the container 10, where an acoustic interference image or another acoustic interference pattern can be formed at that location, thus determining the shape to be obtained.

Figure 5:
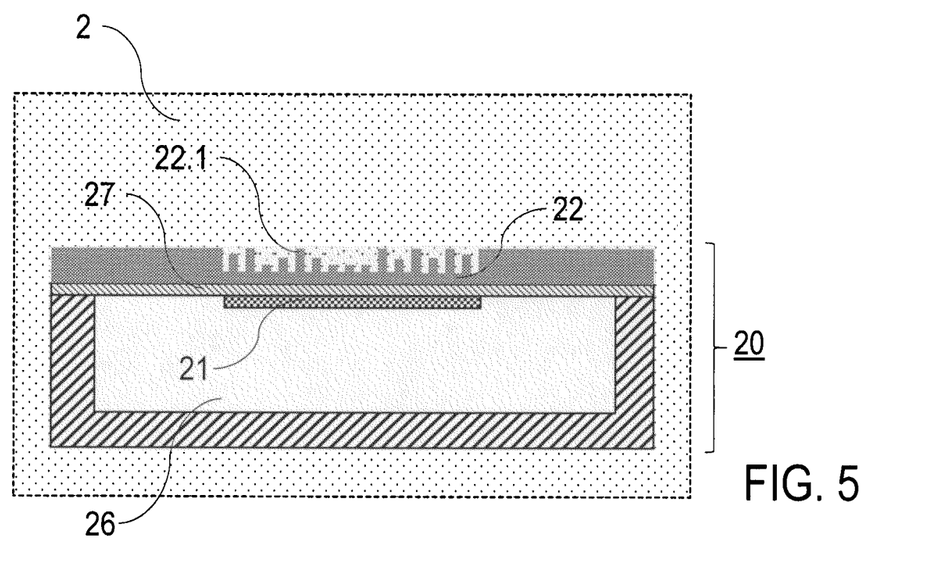
FIGS. 5 and 6: further details of transmission and reflection holograms used according to the invention.

FIG. 5 schematically illustrates a cross-sectional view of an acoustic source device 20, which can be used e.g. with the examples of FIG. 1, 3 or 4. The acoustic source device 20 comprises a hollow carrier 26, which has a shape of a cylindrical box with a sound transmitting sidewall 27. The inner space of the cylindrical box is filled with a gas, e.g. air. The sidewall 27 carries the acoustic source 21, like the piezo-electric oscillator, on an inner surface thereof. On an outer surface of the sidewall 27, facing to the surrounding working medium 2, a transmission hologram 22 is arranged. The transmission hologram 22 is directly connected with the sidewall 27, e.g. with a screw or glue connection. Advantageously, the transmission hologram 22 has a fixed alignment relative to the acoustic source 21.

The transmission hologram 22 is made of the plastic material VeroClear (trade name). It comprises a plate with columns 22.1, which protrude perpendicularly relative to the plane of the sidewall 27. The length of the columns creates a phase difference of about 1,5 rad/mm relative to water (sound velocities in water and VeroClear: 1498 m/s and 2330 m/s, respectively, frequency: 1 MHz). The transmission hologram 22 is fabricated e.g. by moulding, milling or with a conventional 3D printer from a plastic. The lengths of the columns are calculated with the Gerchberg-Saxton-Algorithm. In particular, the transmission hologram is calculated in dependency on the wavefront of the primary acoustic wave transmitted through the sidewall 27 and the acoustic interference image to be obtained. The primary wavefront is obtained from a measurement with a hydrophone sensor or by a numerical simulation.

Figure 6:
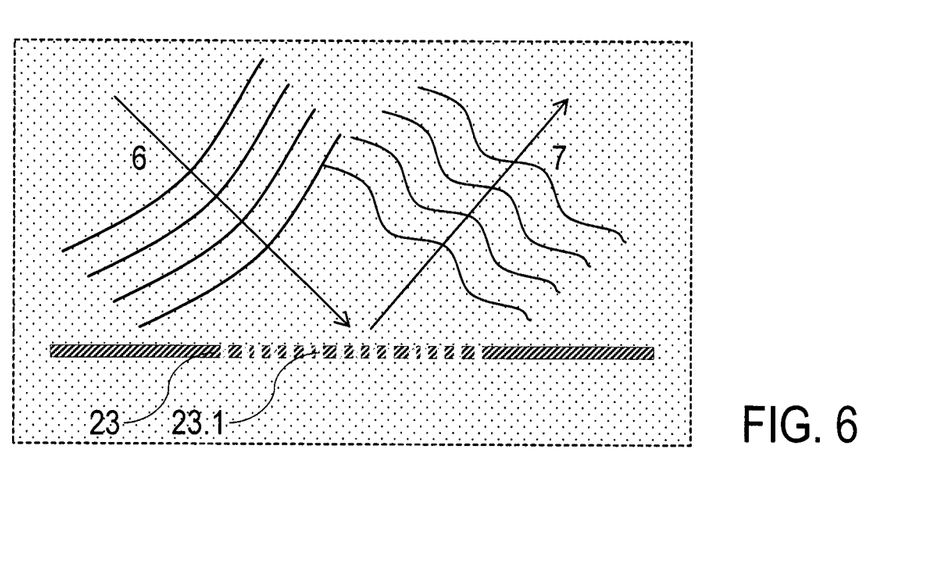

FIG. 6 schematically illustrates a cross-sectional view of a reflection hologram 23 as it is used e.g. with the example of FIG. 2. The reflection hologram 23 is made of a metal sheet, having a thickness of e.g. 1 mm and a lateral extension of 10 cm. The reflection hologram 23 is created by drilling through-holes 23.1 through the plate. The primary acoustic wave 6 is reflected at the reflection hologram 23 so that a plurality of sub-waves is created for forming the acoustic interference image (not shown). The angled orientation of the hologram with respect to the main acoustic path leads to a wide phase distribution along its surface. Through-holes eliminate the reflection of specific sub-waves. A binary hologram method from optics, such as the detour-phase method, can be used to construct the acoustic reflection hologram.

Figure 7:
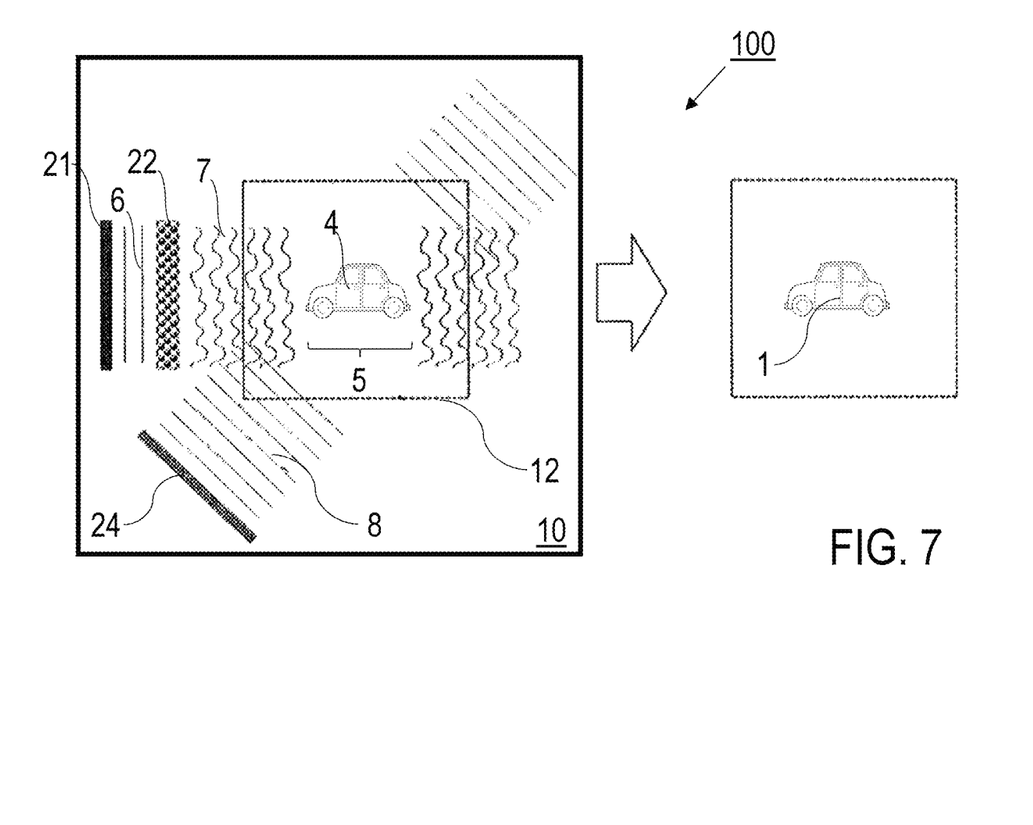
FIG. 7: a schematic illustration of providing an acoustic reference source.

FIG. 7 schematically illustrates the provision of an acoustic reference source 24, which is arranged for emitting an acoustic reference wave 8 to the location of creating the acoustic interference image 5. Both of the acoustic source 21 with the transmission hologram 22 and the acoustic reference source 24 are arranged in the container 10 of the acoustic fabrication apparatus 100. With this example, the acoustic interference image 5 is created by the superposition of the interfering sub-waves 7 created at the transmission hologram 22 and the acoustic reference wave 8. The particle distribution 4 with a shape of the component 1 to be obtained is formed in the sub-container 12. After fixation with a fixation device (not shown), the sub-container 12 with the completed component 1 can be taken from the container 10.

Figure 8:
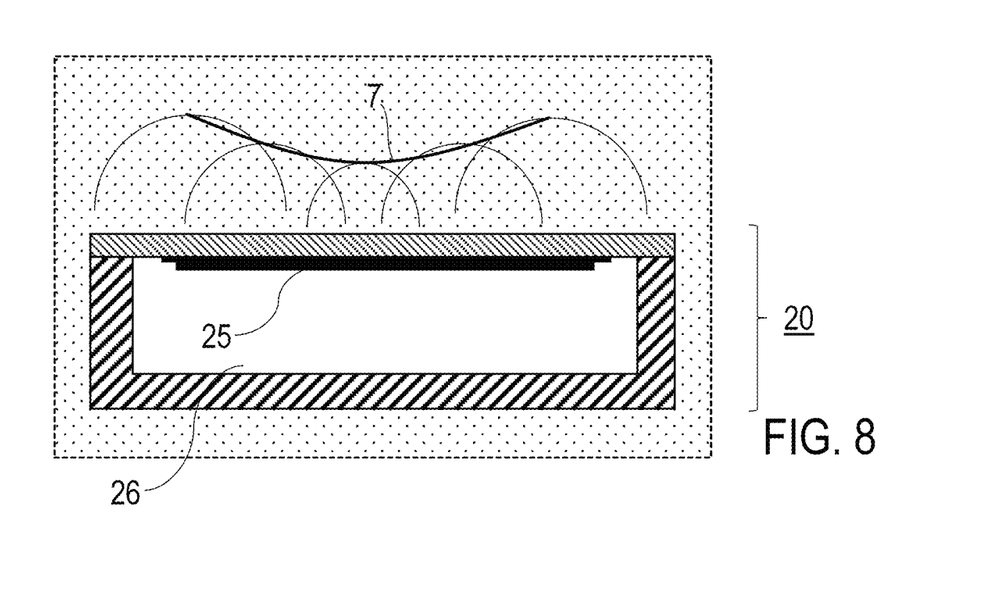
FIG. 8: a schematic illustration of the second embodiment of an inventive acoustic fabrication apparatus.

According to the second embodiment of the invention, the acoustic source device 20 comprises an acoustic array source 25 as schematically illustrated in FIG. 8. The acoustic source device 20 comprises a cylindrical box with a closed inner space filled with a gas, e.g. air. The acoustic array source 25 is coupled to an inner surface of one of the sidewalls of the box. The acoustic array source 25 comprises a two-dimensional matrix arrangement of piezo-electric oscillators. Each of the piezo-electric oscillators can be separately controlled in terms of phase and amplitude. Controlling the phase only is sufficient for creating the acoustic interference image. With a practical example, the acoustic array source 25 comprises a rectangular grid of 32×32=1024 oscillators each having a side length of 1 mm. The phases and amplitudes of the oscillators are selected such that the superposition of all sub-waves creates a wave-front 7 with a shape corresponding to the shape of the component to be obtained.

The features of the invention disclosed in the above description, the FIGS. and the claims can be equally significant for realizing the invention in its different embodiments, either individually or in combination or in sub-combination.

The invention claimed is:

1. A method of fabricating a component, comprising the steps of:

providing a precursor material in a working medium, creating acoustic forces and positioning the precursor material in the working medium under an effect of the acoustic forces, so that a material distribution is formed, which has a shape of the component to be fabricated, and subjecting at least one of the material distribution and the working medium to a fixation, so that the precursor material of the material distribution or the working medium surrounding the material distribution is bound, wherein the step of creating the acoustic forces includes generating an acoustic interference image, which is an acoustically holographic image generated using an acoustic source device being connected by a connection with a control device and being operated by the control device for creating a primary acoustic wave and additionally to the acoustic source device, using a phase hologram, wherein, for generating the acoustically holographic image, the phase hologram includes an acoustic diffractive element that imparts a phase modulation on the primary acoustic wave created by the acoustic source device, said acoustic diffractive element including a solid holographic plate being arranged as a transmission hologram or a reflection hologram, a structure of said acoustic diffractive element being calculated in dependency on a wavefront of the primary acoustic wave and an intensity distribution corresponding to the shape of the component to be fabricated, wherein the acoustic diffractive element is placed along an acoustic beam path between the acoustic source device and the precursor material in the working medium, the material distribution is formed by moving the precursor material towards energy extrema of the holographic image, and the holographic image is created independently of an inner shape of a container accommodating the working medium with the precursor material.

2. The method according to claim 1, wherein the material distribution is formed by collecting the precursor material around the energy extrema of the holographic image or at a holding surface in a neighborhood of the energy extrema of the holographic image.

3. The method according to claim 1, wherein
the holographic image is generated by transmitting the primary acoustic wave from the acoustic source device via the acoustic diffractive element to the working medium.

4. The method according to claim 3, wherein
the acoustic diffractive element is a transmission hologram or a reflection hologram.

5. The method according to claim 1, wherein
the holographic image is generated by a plurality of acoustic waves including the primary acoustic wave, the plurality of acoustic waves formed with a plurality of acoustic sources being acoustically coupled with the working medium.

6. The method according to claim 5, wherein
the holographic image is generated by acoustic waves formed with at least one acoustic source being acoustically coupled with the working medium.

7. The method according to claim 1, including at least one of the steps
generating the holographic image with varying acoustic waveform, and
an acoustic reference wave is transmitted from an acoustic reference source into the working medium simultaneously with the primary acoustic wave from the acoustic source device.

8. The method according to claim 1, wherein
the fixation is triggered by at least one of thermal energy, an irradiation, and a fixation agent.

9. The method according to claim 1, wherein
all the precursor material of the material distribution is subjected to the fixation simultaneously.

10. The method according to claim 1, wherein
the fixation includes at least one of binding precursor materials of the material distribution with each other and binding the precursor materials of the material distribution with the working medium.

11. The method according to claim 1, wherein
the fixation includes binding the working medium around the material distribution, wherein
the precursor material of the material distribution is separated from the bound working medium.

12. The method according to claim 1, including at least one of the features
the precursor material comprises at least one of solid particles, liquid particles, droplets, bubbles, soft matter particles, molecules, biological matter, and biological cells, and
the working medium comprises one of a gas, a liquid, a slurry, an emulsion, a suspension, and a foam.

13. The method according to claim 1, wherein the material distribution has one of the features
the material distribution extends along a line,
the material distribution extends along a surface,
the material distribution extends in a three-dimensional volume,
the material distribution is enclosed by a topologically closed surface, and
the material distribution comprises at least two sub-distributions.

14. The method according to claim 1, wherein
the steps of generating the holographic image, forming the material distribution and subjecting at least one of the material distribution and the working medium to the fixation are repeated at least once.

15. An apparatus for fabricating a component, comprising:
an acoustic source device being arranged for creating acoustic forces and positioning a precursor material in a working medium under an effect of the acoustic forces, so that a material distribution is formed, which has a shape of the component to be fabricated, wherein the acoustic source device is arranged for generating an acoustic interference image, which is an acoustically holographic image generated using the acoustic source device connected by a connection with a control device and being operated by the control device for creating a primary acoustic wave and additionally to the acoustic source device, using a phase hologram, wherein, for generating the acoustically holographic image, the phase hologram includes an acoustic diffractive element that imparts a phase modulation on the primary acoustic wave created by the acoustic source device, said acoustic diffractive element including a solid holographic plate being arranged as a transmission hologram or a reflection hologram, a structure of said acoustic diffractive element being calculated in dependency on a wavefront of the primary acoustic wave and an intensity distribution corresponding to the shape of the component to be fabricated, so that the precursor material can be moved towards energy extrema of the holographic image for forming the material distribution, the acoustic diffractive element is placed along an acoustic beam path between the acoustic source device and the precursor material in the working medium, and a container arranged for accommodating the working medium including the precursor material, the container having an inner shape, the acoustic source device configured to generate the holographic image independently of the inner shape.

16. The apparatus according to claim 15, wherein the acoustic source device comprises an acoustic source.

17. The apparatus according to claim 15, wherein the acoustic source device comprises
an acoustic array source being arranged for generating the holographic image.

18. The apparatus according to claim 15, further comprising
an acoustic reference source which is arranged for transmitting an acoustic reference wave into the working medium.

19. The apparatus according to claim 18, wherein the container includes at least one of
acoustic absorbing and anti-reflection materials on inner walls of the container,
a sub-container being arranged in the container for accommodating the working medium including the precursor material in a sub-volume of the container, and
a material carrier providing a holding surface in the working medium.

20. The apparatus according to claim 15, further comprising
a fixation device being arranged for subjecting at least one of the material distribution and the working medium surrounding the material distribution to a fixation, wherein
the fixation device is arranged for supplying at least one of thermal energy, an irradiation and a fixation agent into the container.

* * * * *